Patented Dec. 20, 1927.

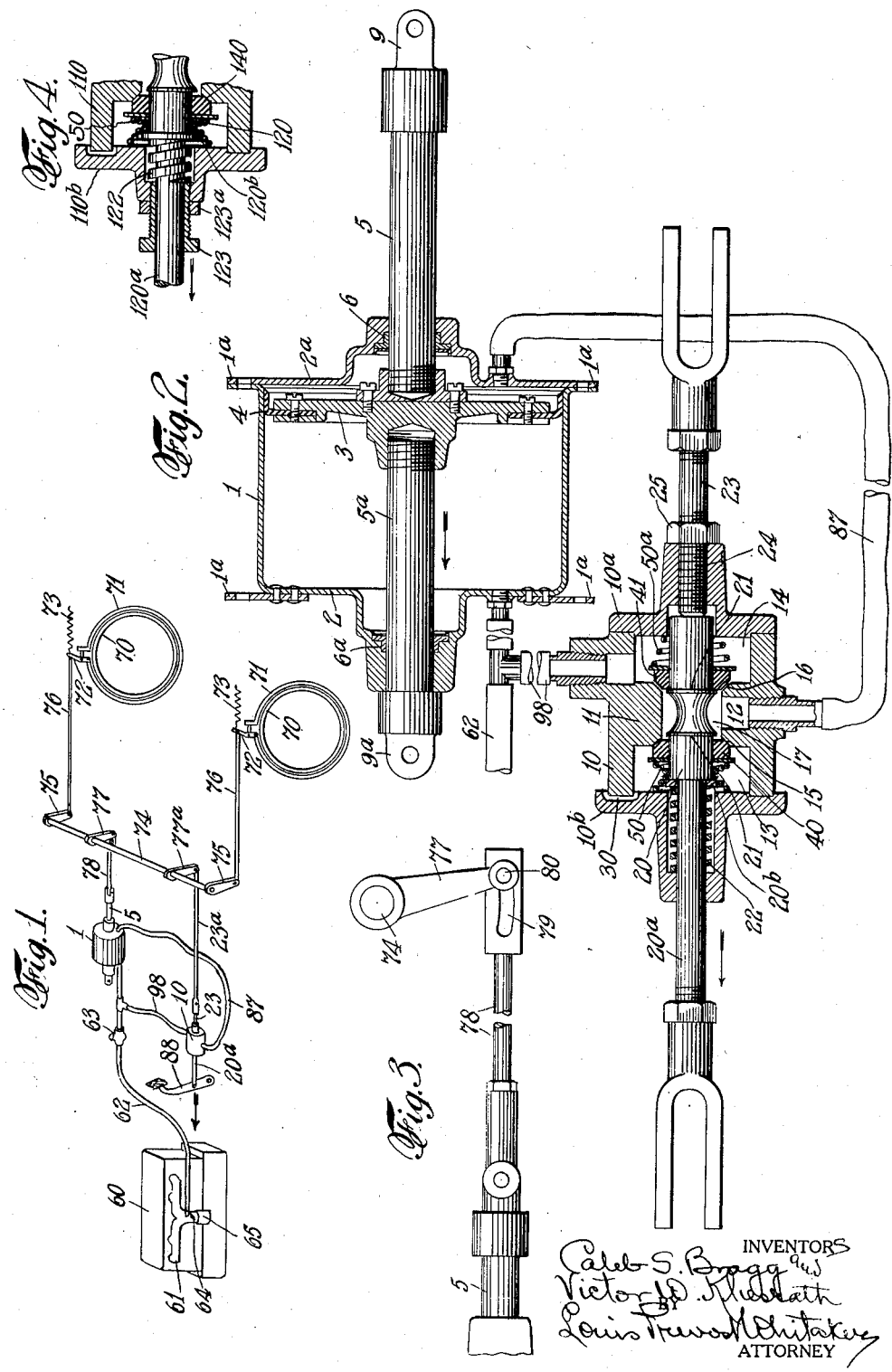

1,653,146

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR.

Application filed January 23, 1926. Serial No. 83,334.

Our invention consists in the novel features hereinafter disclosed, reference being had to the accompanying drawing which illustrates one embodiment of the same, selected by us for purposes of illustration, and the said invention is fully disclosed in the following description and claims.

Our present invention consists in a novel, single acting power actuator and controlling valve mechanism therefor, especially adapted for use in connection with automotive vehicles operating on land, in or upon the water, or in the air and operated by atmospheric air (or other higher pressure fluid) working against suction, most conveniently afforded by a connection with the suction passage of the internal combustion engine employed for the propulsion of the vehicle, and most conveniently by a connection with the intake manifold thereof. Our actuator is particularly desirable for use in the application of brake mechanism of automotive vehicles operated on land, such as trucks, busses, trailers and the like. Due to the relatively low pressures under which a vacuum or suction actuated actuator works (about 20 inches of mercury) or the equivalent of approximately nine pounds of pressure per square inch, these actuators, which comprise a cylinder, closed at both ends and a single acting piston working in the cylinder, are required to be of such large size that where it is necessary to exhaust the air from the large space within the cylinder forward of the piston, and from a sufficiently large pipe connecting it with the suction passage of the engine, as will permit the passage of this air in sufficient quantities to effect a satisfactory application of the brakes or the operation of other parts to be operated, the air so exhausted and delivered into the manifold would stall the motor if idling, and thereby shut off the source of suction upon which the operation of the actuator depends.

According to our present invention, we provide such a cylinder with means for connecting it on one side of the piston with the source of suction, to wit, the intake manifold, of the engine, and the piston is caused to operate by admitting higher pressure fluid, as atmospheric air, to the cylinder on the opposite face of the piston, to effect the movement of the piston, and subsequently withdrawing this air to permit the return stroke of the piston to be effected by the draft of the brake mechanism, and the retracting springs thereof. The piston is therefore normally maintained submerged in vacuum, and the operative stroke of the piston, as in applying the brakes, will be effected under the full power of the apparatus, and instantaneously, without delivering any material quantity of air to the intake manifold, or other suction passage of the engine, and therefore without materially affecting the explosive mixture passing to the cylinders, so that the operation of the engine is not interfered with. The draft of the applied brakes and the customary springs employed to free the frictional surfaces of the brake mechanism from contact in the off or released position, will be more than sufficient to return the piston to the normal or off position, without the necessity of employing other means, in the same manner that the draft of the applied brakes of any motor vehicle returns the brake pedal to the normal or off position. During the return movement of the piston, the air previously admitted to operate the piston, is withdrawn and delivered into the intake manifold under the control of restritcing means, if necessary so as not to interfere with the operation of the engine or stall the same if idling. According to our present invention, the portion of the cylinder in rear of the piston is connected with the suction means, or with the atmosphere (or other source of higher pressure) by a novel form of valve mechanism, which is preferably located outside of the cylinder and in the linkage connecting the foot lever, or other operator operated part with the brake mechanism, the valve mechanism being connected to the cylinder by a flexible piping to permit of its movement relatively with respect to the cylinder. This permits the operator to add his physical force to that exerted by the actuator piston when desired, and also to directly operate the brake mechanism by his own physical force in case of failure of power for any reason, simultaneously placing the valve mechanism in position to vent the cylinder. Our invention also includes provision in the connections between the piston of the actuator and the brake mechanism, of lost motion, so that if the operator, on failure of power is obliged to operate the brake mechanism by his own physical force, the piston of the actuator need not be moved at all, thus relieving the operator from the necessity of diverting a certain amount of force required to move the piston, and enabling him to apply his entire physical force to the brake mechanism, and our invention also includes certain novel constructions and combinations of parts hereinafter fully described and particularly pointed out in the claims.

In the accompanying drawings, which illustrate one form in which we have contemplated embodying our invention, Fig. 1 represents a diagrammatic view illustrating an installation of an automotive vehicle of our improved actuator, for operating the brake mechanism thereof, the suction being effected by connections with the intake manifold of the engine.

Fig. 2 is an enlarged sectional view of the actuator cylinder and piston and the valve mechanism for controlling the same, parts being broken away.

Fig. 3 is a detail view illustrating one means of providing lost motion in the connection between the piston of the actuator and the brake mechanism.

Fig. 4 is a detail sectional view of a portion of the forward end of the valve casing showing a different type of spring, and adjusting means therefor.

In the accompanying drawings, 1, represents the actuator cylinder, which is closed at both ends. This may be accomplished in various ways, but in the present instance the cylinder is conveniently made with an integral head, 2, at one end, and a detachable head, 2ª, at the other end, secured in position in any desired manner. 3, represents a single acting piston in the cylinder provided with a gasket, 4, and with piston rods, 5, 5ª, extending from the piston through the opposite heads of the cylinder, which are provided with stuffing boxes, 6 and 6ª, respectively, to insure a tight joint. Each piston rod is provided with attaching lugs, 9, or 9ª, so that in installing it, the piston may be caused to either pull or push, as desired, in making its power stroke, which is in the direction of the arrow in Fig. 2. The cylinder, 1, is preferably provided with attaching lugs, indicated at 1ª, for rigidly securing it to the chassis. In Fig. 1, which is merely a diagrammatic view illustrating one form of installation, we have shown two brake mechanisms for the two rear wheels of the vehicle, although it is to be understood that the actuator can be connected with any desired number of brake mechanisms, one or more, located in connection with any of the wheels of the vehicle, or of a trailer, as preferred. In this diagram, Fig. 1, 70—70, represent brake drums adapted to be engaged by brake bands, indicated at 71—71, respectively, and controlled by brake operating levers, 72, the usual retracting springs, 73, being employed to insure the release of the friction surfaces when the brake is released, but it is to be understood that any form of brake mechanism may be employed, and that the connections between the actuator and the brake mechanism may be of any usual or desired type, whether mechanical or hydraulic. In the present instance we have shown a rock shaft, 74, provided with arms, 75, connected by link, 76, with the brake actuating levers, 72, said rock shaft being provided with an arm, 77, connected by a link, 78, with the piston rod, 5, and with an arm, 77ª, connected by a link, 23ª, with the valve casing, 10, so that any movement of the piston causes a corresponding movement of the valve casing 10 and the brake bands, 71. The link, 78, may be connected pivotally with the arm, 77, if desired, but we prefer to provide the rear end of the link, 78, with a slot, indicated at 79, in Fig. 3, engaging a pin, 80, in the outer end of the arm, 77, for the purpose of providing for lost motion, so that in case the brake mechanism is operated by the operator operated part only, as hereinafter described, such operation will not effect a movement of the piston, and the full physical force of the operator may be exerted directly upon the brake mechanism but this provision for lost motion may, if desired, be omitted as in many cases the friction of the actuator piston will not be so great as to seriously interfere with the operation of the brake mechanism by the physical force of the operator, especially as the piston will be vented by the operation of the valve mechanism, as hereinafter explained.

60 represents, diagrammatically, an internal combustion engine, for propelling the vehicle, provided with the usual intake manifold, indicated at 61, connected with the carburetor, indicated at 65, and provided with the usual throttle valve, indicated at 64. 62 represents a suction pipe, connected to the actuator cylinder forward of the piston, and connected to the intake manifold between the throttle valve and the engine cylinders, and preferably provided with a check valve, indicated at 63.

In the preferred form of our invention illustrated in the accompanying drawing, the controlling valve mechanism for the actuator is located entirely outside of the cylinder, in a casing, which is inserted in a linkage between the operator operated part, which may be a foot lever, 88, for example, and the brake mechanism, the said valve mechanism being movable longitudinally of such linkage and being connected with the cylinder by a flexible piping, which will permit the necessary movement of the valve casing. In this instance we have shown a valve casing at 10, provided with two valve chambers, 13 and 14, separated by a central partition having an aperture, 17, therethrough, and provided at opposite ends of said aperture with oppositely disposed valve seats, 15 and 16. In conjunction with these valve seats, we employ an air inlet valve, 40, for example, for engaging the valve seat, 15, and a suction valve, 41, for engaging the valve seat, 16. Each of these valves is provided with yielding means, for moving the valve in a direction toward its seat, and in this instance we have shown spiral springs, 50 and 50ª, interposed between the valves and the adjacent ends, 10ª and 10ᵇ, of the valve casing. The valves, 40 and 41, are preferably, though not necessarily, formed of molded rubber and are provided with central apertures which engage a valve actuating rod or stem, indicated at 20, which extends through the central apertures of said valves. We prefer to provide the central apertures in the molded rubber valve so that they will fit the portions of the rod, 20, which they engage so as to make an air tight joint therewith, while permitting the rod to move slightly through the valve, but other means may be employed for sealing the joint between the valve and operating rod, or stem, while permitting the movement of the rod therethrough. The valve actuating rod is also provided with valve actuating means, in this instance annular shoulders, or collars, indicated at 21—21, located between the valves, and so arranged that a movement of the valve actuating rod, 20, in either direction, will open one of the valves only. We also provide means for normally holding the suction valve, 41, in slightly open position to provide a restricted passage communicating with the suction pipe when the valve mechanism is in the normal or off position, in which it is indicated in Fig. 2. This may be accomplished in any desired way, but in the present instance we have shown the valve actuating rod, 20, provided with a retracting spring, indicated at 22, surrounding the rod, 20, or an extension thereof, and located in a recess in the head, 10ᵇ, of the valve casing, which tends to press the valve actuating rod in a direction opposite the arrow in Fig. 2, and the opposite head, 10ª, of the valve casing is provided with a stop for engaging the valve actuating rod and limiting it in a position to hold the suction valve, 41, in a cracked or slightly opened position. In this instance, the head, 10ª, of the valve casing is provided with a threaded aperture, which is engaged by the threaded portion, 24, of a link rod, 23, which is screwed into the valve casing head, so as to project inwardly and engage, and serve as an adjustable stop, for the valve actuating rod, 20. The link rod, 23, may be secured in adjusted position by means of a set nut, 25, or otherwise. In the present instance the forward end of the valve actuating rod, 20, indicated at 20ª, is connected with the foot lever, 88, and the rear end of the link rod, 23, is connected by a link, 23ª, with an arm, 77ª, on the rock shaft, 74. The valve actuating rod, 20, is also provided with a stop or collar, 20ᵇ, which limits its movement in the direction of the arrow, Fig. 2, with respect to the valve casing, the said collar being adapted to engage the head, 10ᵇ, of said casing when the valve actuating rod, 20, has been moved far enough in the direction of the said arrow to effect the closing of the suction valve, 41, and the opening of the air inlet valve, 40, to the desired extent, thus relieving the valve mechanism itself from undue strain, and it will be seen that any further forward movement of the valve actuating rod, 20, with respect to the valve casing, will enable the operator to add his physical force to that of the actuator piston, in setting the brake mechanism, or will enable him to set the brake mechanism independently of the piston in case of failure of power.

It will be understood that the valve casing and valves are supported directly in the linkage between the foot lever, 88, and the brake mechanism, and that the valve casing and valves move longitudinally with the foot lever. The valve chamber, 14, of the valve casing is connected by a flexible pipe, indicated at 98, with the suction pipe, 62, preferably between the check valve, 63, and the forward end of the cylinder, 1, of the power actuator. The valve casing is also provided with a recess, 12, in the central partition, 11, between the valve seats, which recess is connected by a flexible pipe, 87, with the cylinder of the actuator in rear of the piston (at the right in Fig. 2). The valve casing is also provided with means for connecting the valve chamber, 13, with a source of higher pressure fluid, as the atmosphere, and in this instance the head, 10ᵇ, of the valve casing is provided with an air inlet, 30, communicating with the chamber, 13.

The parts being in normal or off position, as indicated in Fig. 2, and the engine being in operation, the air in the cylinder, 1, of the actuator on both sides of the piston will be withdrawn through the pipe, 62, which leads directly to the cylinder forward of the piston, and the pipe, 98, leading to the valve casing, the suction valve, 41, being in slightly open position, thus connecting the pipe, 98, with the pipe, 87, leading to the cylinder on the other side of the piston. The piston is therefore submerged in vacuum. To apply the brakes the operator places his foot on the brake pedal, or lever, 88, and moves it in the direction of the arrow in Fig. 1. This effects the forward movement of the valve actuating rod, permitting the suction valve, 41, to close, and thereafter the inlet valve, 40, to open. The air (or other higher pressure fluid) will instantly enter the cylinder in rear of the piston (at the right in Fig. 2) by way of chamber, 17, recess, 12, and pipe, 87, and move the piston forward in the direction of the arrow with the full force of the apparatus, and as rapidly as desired, according to the extent to which the brake lever, 88, is moved. The forward portion of the cylinder being at all times connected with the suction means the forward movement of the piston does not cause any appreciable quantity of air to be delivered into the intake manifold, and therefore the operation of the engine is not materially affected, and there is no danger of stalling, if idling. The forward movement of the foot lever, 88, is followed by the forward movement of the piston and the valve casing connected therewith through the arms, 77 and 77ª, and the shaft, 74, thus applying the brakes to the desired extent and as soon as the movement of the foot lever ceases, the slightest continued movement of the piston and valve casing will permit the air inlet valve, 40, to close and shut off the further admission of air (or other higher pressure fluid), thus holding the brakes applied. Any subsequent movement of the piston and valve casing in either direction would either cause the suction valve, 41, to open to withdraw any surplus or higher pressure fluid, or cause inlet valve, 40, to open to admit more higher pressure fluid. To release the brakes, the operator has only to release the foot lever slightly so as to permit the retracting spring, in this instance, the spring, 22, to move the rod, 20, in a direction opposite to that of the arrow in Fig. 2, with respect to the valve casing, which at such times is held forward by the piston, thereby opening the suction valve, 40, after inlet valve, 41, is closed. This causes an equalization of pressure within the cylinder on opposite faces of the piston, permitting the brakes to release themselves, as the air in the cylinder to the rear of the piston is withdrawn and delivered into the intake manifold under the control of the restricted opening of the suction valve permitted by the adjustable stop, 24, so as not to interfere with the explosive mixture passing to the engine cylinder, or stall the engine if idling. The brakes may at any time be reapplied by another forward movement of the pedal lever. If the lever is entirely released, the pressure within the cylinder on opposite sides of the piston will be equalized as the air previously admitted to effect the operation of the piston is withdrawn, leaving the piston submerged in vacuum while the draft of the applied brakes and their retracting springs will return the piston to its normal position, the suction valve, 40, remaining open so as to normally maintain the piston submerged in vacuum when the parts are returned to normal or off position. When the brakes have been applied, in the manner previously described, the operator may, by exerting further pressure on the pedal lever, move the valve actuating rod, 20, forward so as to bring the collar, 20ᵇ, into contact with the end of the valve casing, and take up the lost motion between the said rod and the valve casing, and may then add his physical force to that exerted by the actuator piston, to the brake mechanism through the valve casing and link rods, 23 and 23ª, arm, 77ª, and rock shaft, 74, and its connections with the brake mechanism. In case of failure of power, the operator may directly apply the brakes by his physical force, by pressing forward on the foot lever so as to take up the lost motion between the valve casing, 10, and the valve actuating rod, 20, thereby applying his physical force directly to the rock shaft, 74, and its connections with the brake mechanism. If the arm, 77, is connected to the link, 78, by an ordinary pivotal connection, the piston would be moved, without any resistance other than friction, as the valves would have been previously moved into such a position as to vent the cylinder. Where the slot, 79, is provided, as indicated in Fig. 3, however, the actuator piston would not be moved in case the brakes are applied by the operator on failure of power, as the arm, 76, would simply move in the slot, 79, without imparting movement to the piston.

In Fig. 4 we have illustrated a slight modification of our invention in which the valve operating part is provided with a retracting spring so constructed as to provide varying degrees of resistance within a very short compressing movement and provided with adjustable means for varying the normal tension of the spring. In this figure, the valve casing is represented at 110, and the end plate containing the spring recesses, is indicated at 110ᵇ, the valve actuating rod is indicated at 120, and the extension connected with the operator operated part is indicated at 120ª. The various parts of the valve mechanism other than those hereinafter described will be understood to be substantially identical with the construction illustrated in Fig. 2 and previously described, and the showing of the valve mechanism itself is therefore broken away in Fig. 4. The valve actuating part, 120, is provided with a shoulder where it joins the extension, 120ª, against which the stop collar, 120ᵇ, engages, for limiting the relative movement between the valve actuating rod and the valve casing when the valve actuating part is moved in the direction of the arrow to effect the opening of the inlet valve, 140, and apply the brake. 122 represents a special spring interposed between the said collar, 120ᵇ, for example (or other part connected with the valve actuating part) and an adjustable sleeve, 123, surrounding the extension, 120ª, of the valve actuating part, in this instance exteriorly threaded and screwed into a threaded aperture in the head, 110ᵇ, of the valve casing. This spring is of the type which increases its resistance very rapidly within a short compressing movement. For example, we may apply a spring capable of building up a resistance from below zero to one hundred pounds pressure within a movement of one eighth of an inch compression. By adjusting the sleeve, 123, the normal resistance of the spring can be varied to any particular point between the extremes of pressure, so as to give any desired feeling of resistance to the foot pedal, and varying the amount of pressure required to operate the valve mechanism. Furthermore, the valves may be slightly moved in a direction to apply the brakes, so as to effect a normal application of the brakes with much less foot pressure than would be required to operate the valves to a greater extent for a more rapid application of the brakes, as in an emergency. In other words, the resistance of the spring to be overcome by the operator's foot will increase directly in proportion to the opening of the valve, and the rapidity with which this spring builds up its pressure acts as an automatic governor on the operator's foot, preventing him from making too harsh an application of the brakes without intending to do so, as the resistance to his foot which he must overcome by the exertion of pressure, will serve as an indication to him of the extent to which he is actually applying the brakes, in a manner similar to that in which an operator feels the actual appplication of the brakes with the ordinary foot lever directly connected thereto. By adjusting the sleeve, 123, the spring can be set so as to give the normal or initial resistance which is desired by the particular operator, and when this point of adjustment has been obtained, the sleeve may be held rigidly in position by any suitable means, as a set nut, 123ª.

It will be understood that a single valve mechanism such as herein shown and described can be connected with and control a plurality of power actuators each comprising a cylinder and piston constructed and connected with the valve mechanism as hereinbefore described, for securing the simultaneous operation thereof, in substantially the same manner as shown and described in our former application for Letters Patent of the United States Serial No. 163,351, filed January 25, 1927, which is a division of our former earlier application, Serial No. 31,281, filed May 19, 1925.

What we claim and desire to secure by Letters Patent, is:—

1. In a power actuator, the combination with a cylinder closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves in a direction to open one when said rod is moved in either direction, yielding means for normally pressing said valves in directions toward their seats, and an operator operated part connected with said valve actuating part.

2. In a power actuator, the combination with a cylinder closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves, in a direction to open one when said rod is moved in either direction, yielding means for normally pressing said valves in directions toward their seats, and an operator operated part connected with said valve actuating part, and means for connecting said valve actuating part with the part to be actuated independently of the connection of the actuator piston therewith.

3. In a power actuator, the combination with a cylinder closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves in a direction to open one when said rod is moved in either direction, yielding means for normally pressing said valves in directions toward their seats, and an operator operated part connected with said valve actuating part, means for connecting the valve casing with the part to be actuated, and means for connecting the valve actuating part with the valve casing, permitting sufficient lost motion to insure the operation of the valves.

4. In a power actuator, the combination with a cylinder closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves in a direction to open one when said rod is moved in either direction, yielding means for normally pressing said valves in directions toward their seats, and an operator operated part connected with said valve actuating part, and means for maintaining one of said valves in open position when the piston is in its normal or off position to maintain the piston submerged in vacuum.

5. In a power actuator, the combination with a cylinder, closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves in a direction to open one when said rod is moved in either direction, yielding means for normally pressing said valves in directions toward their seats, and an operator operated part connected with said valve actuating part, yielding means normally tending to move one of said valves into open position to maintain the piston submerged in vacuum when in off position, and an adjustable stop for varying the amount of opening of said valve to provide a predetermined restricted opening between said valve and its seat whenever said valve is opened.

6. In a power actuator, the combination with a cylinder closed at both ends, a single acting piston in said cylinder, and means for connecting said piston with a part to be actuated, suction means connected with the cylinder on the forward side of the piston, reversing valve mechanism comprising a valve casing provided with a pair of valve chambers separated by a central partition having an aperture therethrough, and an oppositely disposed valve seat at the ends of said aperture, one of said valve chambers being connected with a source of higher pressure, the other of said valve chambers being connected with the actuator cylinder on one side of the piston therein, and with a source of suction, said central partition between said valve chambers being connected with the cylinder on the other side of the piston, oppositely disposed valves engaging said valve seats, a valve actuating part extending through the valve chamber and said valves, and provided with means for moving said valves in a direction to open one when said rod is moved in either direction, yielding means for normally pressing said valves in directions toward their seats, and an operator operated part connected with said valve actuating part, means for connecting the valve actuating part with the part to be actuated, a connection between the piston of the actuator and the part to be actuated, being provided with means permitting lost motion, to enable the part to be actuated to be operated by the operator operated part in case of failure of power, without moving the piston of the actuator.

7. The combination with a power actuator comprising a cylinder closed at both ends, and a single acting piston in said cylinder, and means for connecting the piston with a part to be actuated, an operator operated part operatively connected with the part to be actuated, and controlling valve mechanism for the actuator interposed in the connections between the operator operated part and the part to be actuated and comprising a valve casing connected by a flexible connection with the cylinder on both sides of the piston and with a source of suction, said valve casing being also provided with means for connecting it with a source of higher pressure fluid, oppositely disposed valves in said valve casing, and yielding means for normally pressing said valves in a direction to close them, the connections between the operator operated part and the part to be actuated including a valve actuating rod extending through said valves provided with means for operating them in a direction to open one when moved in either direction with respect to the valve casing.

8. The combination with a power actuator comprising a cylinder closed at both ends, and a single acting piston in said cylinder, and means for connecting the piston with a part to be actuated, an operator operated part operatively connected with the part to be actuated, and controlling valve mechanism for the actuator interposed in the connections between the operator operated part and the part to be actuated and comprising a valve casing connected by a flexible connection with the cylinder on both sides of the piston and with a source of suction, said valve casing being also provided with means for connecting it with a source of higher pressure fluid, oppositely disposed valves in said valve casing, and yielding means for normally pressing said valves in a direction to close them, the connections between the operator operated part and the part to be actuated including a valve actuating rod extending through said valve provided with means for operating them in a direction to open one when moved in either direction with respect to the valve casing, yielding means interposed between the valve casing and the valve actuating rod for normally moving said rod with respect to the valve casing in a direction to open one of said valves to establish communication between the cylinder on both sides of the piston and said suction means, and a stop for limiting the relative movement of said valve actuating rod with respect to the valve casing under the action of said yielding means.

9. The combination with a power actuator comprising a cylinder closed at both ends, and a single acting piston in said cylinder, and means for connecting the piston with a part to be actuated, an operator operated part operatively connected with the part to be actuated, and controlling valve mechanism for the actuator interposed in the connections between the operator operated part and the part to be actuated and comprising a valve casing connected by a flexible connection with the cylinder on both sides of the piston and with a source of suction, said valve casing being also provided with means for connecting it with a source of higher pressure fluid, oppositely disposed valves in said valve casing, and yielding means for normally pressing said valves in a direction to close them, the connections between the operator operated part and the part to be actuated including a valve actuating rod extending through said valve provided with means for operating them in a direction to open one when moved in either direction with respect to the valve casing, a spring interposed between the valve casing and said valve actuating rod normally tending to move said rod in a direction to open one of said valves, to connect the cylinder on both sides of the piston with the suction means, a stop for limiting the relative movement of said rod with respect to said valve casing under the action of said spring, said rod being provided with a part for engaging the valve casing when the rod is moved in the opposite direction to limit the relative movement of the rod with respect to the valve casing, and permit the actuated part to be directly operated by the operator operated part in case of failure of power.

10. In an automotive vehicle provided with an internal combustion engine having a suction passage between the throttle valve and the cylinders of the engine, and brake mechanism for the vehicles, a power actuator comprising a cylinder, closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing.

11. In an automotive vehicle provided with an internal combustion engine having a suction passage between the throttle valve and the cylinders of the engine, and brake mechanism for the vehicle, a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connection between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing, and means for limiting the relative movements of the valve actuating rod with respect to the valve casing.

12. In an automotive vehicle provided with an internal combustion engine having a suction passage between the throttle valve and the cylinders of the engine, and brake mechanism for the vehicle, of a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing, yielding means interposed between the valve casing and said rod, for normally moving it in a direction to open one of said valves, to connect the cylinder on opposite sides of the piston with the suction pipe.

13. In an automotive vehicle provided with an internal combustion engine having a suction passage between the throttle valve and the cylinders of the engine, and brake mechanism for the vehicle, of a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing, yielding means interposed between the valve casing and said rod, for normally moving it in a direction to open one of said valves, to connect the cylinder on opposite sides of the piston with the suction pipe, and adjustable means for limiting the relative movement of said rod with respect to the valve casing under the action of said yielding means.

14. In an automotive vehicle provided with an internal combustion engine having a suction passage between the throttle valve and the cylinders of the engine, and brake mechanism for the vehicle, of a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing, yielding means interposed between the valve casing and said rod, for normally moving it in a direction to open one of said valves, to connect the cylinder on opposite sides of the piston with the suction pipe, and means for limiting the relative movement of said rod with respect to the valve casing in the opposite direction to permit the operator to apply physical force to the brake mechanism through the operator operated part.

15. In an automotive vehicle provided with an internal combustion engine having a suction passage between the throttle valve and the cylinders of the engine, and brake mechanism for the vehicle, of a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valve, and being provided with means for moving said valves in a direction to open one when moved in either direction with respect to the valve casing, means for limiting the relative movement between the valve casing and the valve actuating rod to enable the operator to apply his physical force directly to the brake mechanism, the connection between the actuator piston and the brake mechanism providing lost motion to permit the brake mechanism to be actuated by the operator operated part without moving the piston.

16. The combination with a power actuator comprising a cylinder closed at both ends, and a single acting piston in said cylinder, and means for connecting the piston with a part to be actuated, an operator operated part operatively connected with the part to be actuated, and controlling valve mechanism for the actuator interposed in the connections between the operator operated part and the part to be actuated and comprising a valve casing connected by a flexible connection with the cylinder on both sides of the piston and with a source of suction, said valve casing being also provided with means for connecting it with a source of higher pressure fluid, oppositely disposed valves in said valve casing, and yielding means for normally pressing said valves in a direction to close them, the connections between the operator operated part and the part to be actuated including a valve actuating rod extending through said valve provided with means for operating them in a direction to open one when moved in either direction with respect to the valve casing, means for limiting the relative movement of the valve actuating rod with respect to the valve casing, whereby the valve casing may be moved by the operator operated part, and connections extending from the valve casing to the part to be actuated, and to the piston of the actuator, whereby the valve casing is moved by and with the piston when the latter is moved by power or by the draft of the applied brakes.

17. In an automotive vehicle provided with an internal combustion engine having a suction passage between the throttle valve and the cylinders of the engine, and brake mechanism for the vehicle, of a power actuator comprising a cylinder closed at both ends, a single acting piston in the cylinder, connections from said piston to the brake mechanism, an operator operated part, means for connecting it with the brake mechanism, a suction pipe connecting the cylinder on one side of the piston at all times with said suction passage of the engine, valve mechanism for controlling the cylinder located in and supported by the connections between the operator operated part and the brake mechanism, and comprising a longitudinally movable valve casing, flexible connections between the valve casing and the cylinder on the other side of the piston, and between the valve casing and said suction pipe, said valve casing being provided with means for admitting a higher pressure fluid thereto, oppositely disposed valves in said valve casing, yielding means for normally seating the valves, connections between the operator operated part and the brake mechanism, including a valve operating rod extending through said valve casing and through said valves, and being provided with means for moving said valves in a direction to open one when moved in either direction with respect to the valve casing, means for limiting the relative movement between the valve casing and the valve actuating rod to enable the operator to move the valve casing and apply his physical force directly to the brake mechanism, and means for connecting the valve casing with the brake mechanism and with the piston of the actuator, whereby the valve casing is moved by and with the piston when the latter is moved by power or by the draft of the applied brakes.

18. In a power actuator, the combination with a cylinder closed at both ends, a single acting piston located therein, and means for connecting the piston to a part to be operated, of a reversing valve mechanism exterior to the actuator cylinder and piston, provided with a passage connected with the cylinder on the forward side of the piston and with a source of suction, a passage connected with the cylinder on the other side of the piston, and a passage for connecting the valve casing with a source of higher pressure, a pair of oppositely disposed valves in said valve casing for controlling said passages, yielding means for normally pressing said valves toward their seats, a valve actuating part extending through the valve casing and operatively connected with the valves so as to open one of them when moved in either direction with respect to the valve casing, an operator operated part connected with the valve actuating part, a retracting spring for the valve actuating part constructed to vary its resistance within wide limits, during a short compression movement, whereby the resistance of the spring to be overcome by the operator's foot will increase directly in proportion to the opening of the valve.

19. In a power actuator, the combination with a cylinder closed at both ends, a single acting piston located therein, and means for connecting the piston to a part to be operated, of a reversing valve mechanism exterior to the actuator cylinder and piston, provided with a passage connected with the cylinder on the forward side of the piston and with a source of suction, a passage connected with the cylinder on the other side of the piston, and a passage for connecting the valve casing with a source of higher pressure, a pair of oppositely disposed valves in said valve casing for controlling said passages, yielding means for normally pressing said valves toward their seats, a valve actuating part extending through the valve casing and operatively connected with the valves so as to open one of them when moved in either direction, an operator operated part connected with the valve actuating part, a retracting spring for the valve actuating part constructed to vary its resistance within wide limits, during a short compression movement, whereby the resistance of the spring to be overcome by the operator's foot will increase directly in proportion to the opening of the valve, and adjusting means for said spring for regulating the normal or initial pressure to be overcome before any operation of the valve mechanism is permitted.

In testimony whereof we affix our signatures.

CALEB S. BRAGG.
VICTOR W. KLIESRATH.